Patented Nov. 15, 1938

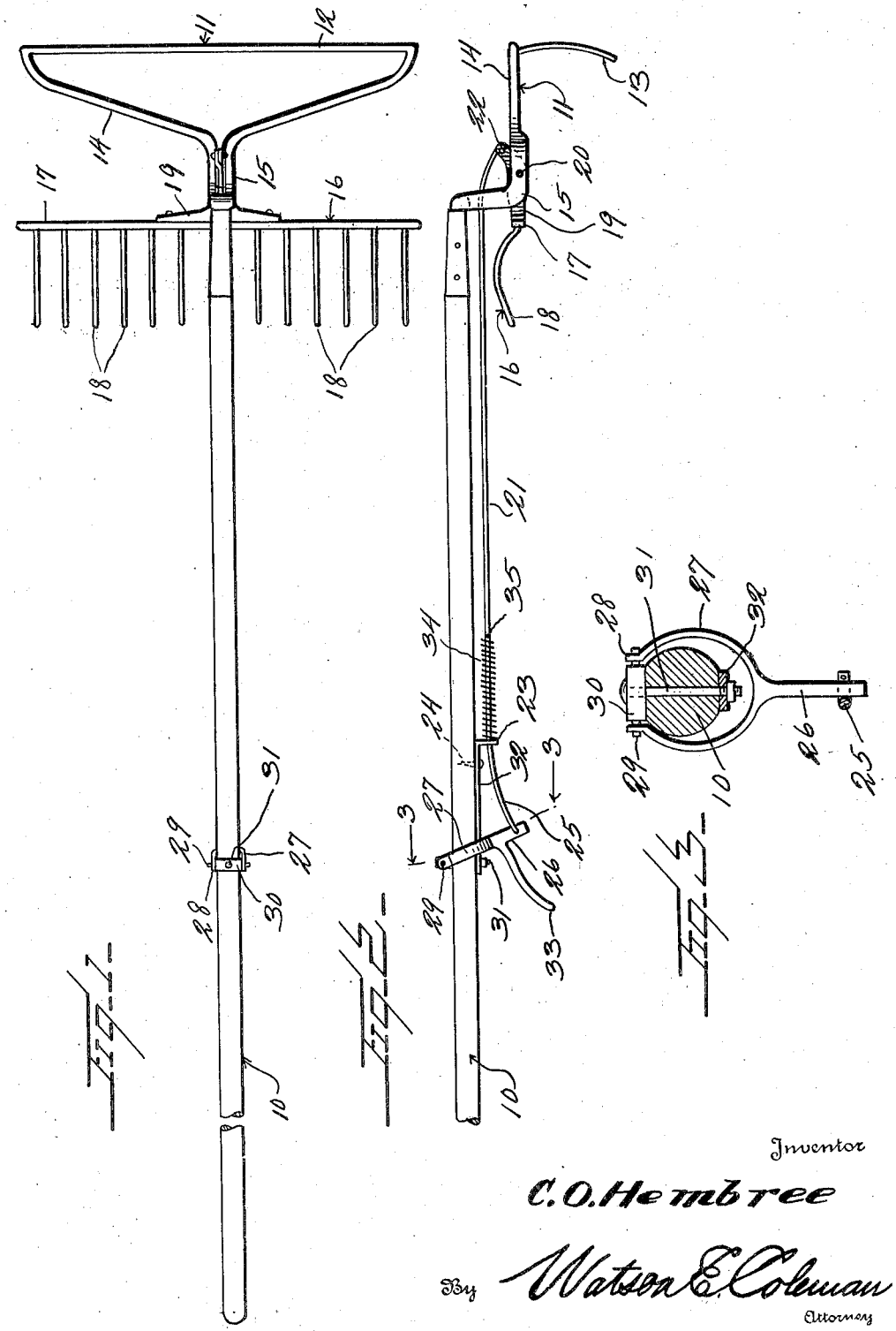

2,136,849

UNITED STATES PATENT OFFICE 2,136,849

PICK-UP RAKE

Charles O. Hembree, Konawa, Okla.

Application August 26, 1937, Serial No. 161,128

2 Claims. (Cl. 55—10)

This invention relates to rakes and more particularly to a hand rake in combination with means whereby material raked up by the head may be picked up.

An object of this invention is to provide a pick-up means in combination with a hand rake which is so constructed that the pick-up means is normally held in inoperative position substantially parallel with the length of the handle and which pick-up means may be swung downwardly to an operative position in order to pick up material which has been raked by the conventional rake head.

Another object of this invention is to provide a pick-up means of this character which can be readily mounted on a conventional handle and which is so constructed that in the event the handle breaks, the device may be incorporated in the new handle.

With the foregoing and other objects in view, the invention will be more fully described hereinafter, and will be more particularly pointed out in the claims appended thereto.

In the drawing, wherein like symbols refer to like or corresponding parts throughout the several views:

Fig. 1 is a detail top plan view of a rake constructed according to an embodiment of this invention.

Fig. 2 is a detail side elevation of the rake.

Fig. 3 is a sectional view taken on the line 3—3 of Fig. 2.

Referring to the drawing, the numeral 10 designates generally an elongated handle which has secured to the forward end thereof, a rake head generally designated as 11. This rake head 11 comprises a head bar 12 to which are secured a plurality of tines 13. A pair of inwardly extending arms 14 are connected at their forward or outer ends to the opposite ends of the cross bar 12 and these arms 14 have their inner ends provided with spaced-apart extensions 15 which are of substantially L-shape and terminate in a rearward extension engaging within the forward end of the handle 10.

A pick-up member generally designated as 16 is mounted on the ends of the arms 14 and comprises a cross bar 17 provided with a plurality of tines 18. A lever 19 is secured to the central portion of the cross bar 17 and is pivotally mounted as at 20 between the parallel extensions 15 of the arms 14. In a normal inoperative position the pick-up member 16 is disposed with the tines 18 substantially parallel with the length of the handle 10, and when swung to an operative position, the tines 18 are adapted to be disposed closely adjacent the lower or free end of the tines 13.

An operating rod 21 is secured at its forward end, as at 22, to the lever 19, and the rear end of the rod 21 slidably extends through a guide member 23 which is secured at its forward end by a fastening member 24 to one side of the handle 10. The rear extremity of the rod 21 is bent outwardly, as at 25, and the end of this extension 25 is pivotally engaged in an operating lever 26. The operating lever 26 has a bifurcated or forked end portion 27 which is longitudinally curved and engages about the handle 10. The ends of the forked portion 27 are provided with ears 28 having a suitable aperture to receive studs 29 carried by a plate 30. The plate 30 has an aperture in substantially the center thereof in which a bolt 31 engages.

The bolt 31 passes thru the handle 10 and thru the rear end of the longer leg 32 of the guide member 23 so as to hold said guide member securely in position on the handle 10 in connection with the fastening member 24. The operating lever 26 is provided with a rearwardly extending hand member 33 which is in convenient relation to the handle 10 so that the operator may readily grasp the handle 10 and the hand member 33 and by pressing the same together will rock the lever 26 in a direction to pull rearwardly on the rod 21 so as to swing the pick-up member 16 downwardly and forward to operative relation to the tines 13 of the rake head.

The pick-up member 16 is constantly urged to an inoperative position by means of an expanding spring 34 which is disposed about the rod 21 and its forward end engages against a stationary member 35 secured to the rod 21 and its opposite or rear end engages against the guide 23.

In the use and operation of this device the pick-up member 16 will be normally disposed in an upper position under the tension of the spring 34 in which position the tines of the pick-up member 16 will be disposed substantially parallel with the handle 10. The rake head 11 may, at this time, be used for normal raking operations and when it is desired to pick up a quantity of material assembled by the rake head 11, the hand member 33 is swung toward the handle 10 so as to co-actively swing the pick-up member 16 downwardly and forwardly toward the free ends of the tines 13 of the rake head 11.

It is, of course, understood that various changes and modifications may be made in the details of construction and design of the above specifically described embodiment of this invention without departing from the spirit thereof, such changes and modifications being restricted only by the scope of the following claims.

I claim:

1. A rake comprising a handle, a rake head provided with laterally spaced angular extensions connected at one end to one end of the handle whereby the rake head assumes a position in offset relation to the handle, a lever pivotally connected intermediate of its ends between said angular extensions of the rake head and carrying a pick-up member, a pull rod extending parallel with the handle on the underside of the latter and pivotally connected at its forward end to one end of said lever and extending between the laterally spaced angular extensions of the rake head, means carried by the handle for guiding the pull rod in its movement, and a hand lever mounted on the handle and connected to the rear end of said pull rod.

2. A rake comprising a handle, a rake head connected to said handle, a pick-up member pivotally connected to the rake head, a pull rod operatively connected at its forward end to the pick-up member and extending along the handle parallel with the latter, a guide member applied to the handle at the rear end of the pull rod and provided with an angularly disposed portion thru which the pull rod passes, a fastening member extending thru the forward end of the guide member and into the handle, a bolt passing thru the handle and the rear end of the guide member, a plate engaging the handle and extending thereacross and provided with studs, said bolt passing thru said plate, and a hand lever connected at one end to the rear end of the pull rod and provided with a hand member, said hand lever being formed with a bifurcated portion loosely embracing the handle and formed with ears that are pivotally mounted upon said studs.

CHARLES O. HEMBREE.